L. C. & J. M. SCHERMERHORN.
Making Cheese.

No. 63,755.    Patented April 9, 1867.

Witnesses:

Inventors:
Levi C. Schermerhorn &
John M. Schermerhorn.
By their Attorney A. B. Stoughton

United States Patent Office.

LEVI C. AND JOHN M. SCHERMERHORN, OF NORTH GAGE, NEW YORK.

*Letters Patent No. 63,755, dated April 9, 1867*

IMPROVEMENT IN MILK VATS.

*The Schedule referred to in these Letters Patent and making part of the same.*

TO ALL WHOM IT MAY CONCERN:

Be it known that we, LEVI C. SCHERMERHORN and JOHN M. SCHERMERHORN, of North Gage, in the county of Oneida, and State of New York, have invented certain new and useful improvements in Apparatus for Heating and Cooling Milk for Cheese-Making; and we do hereby declare the following to be a full, clear, and exact description of the construction and operation of the same, reference being had to the accompanying drawings, making a part of this specification, in which—

Similar letters of reference, where they occur in the separate figures, denote like parts of the apparatus in all the drawings.

The general, if not universal, way of heating milk for cheese-making is by the indirect heat of or from hot water contained between the outer and inner jacket. Instead of using hot water we propose to use the direct application of steam to the exterior of the inner vat, by which mode of heating we gain not only time but can heat the milk quite as regularly throughout the vat, whilst we can cut off the heat instantaneously, which is very important in the process, and which cannot be done when hot water is used as a medium for transmitting the heat to the milk. We also run a cold-water pipe through under the inner vat, perforated with a series of holes, so that as instantaneously as the steam is cut off, just as quickly the cold water can be let on and the cooling commenced; the two operations of heating by steam, cutting off the heat, and applying the cold water, very much expediting the process or preparation of the milk for cheese-making.

Our invention consists in the use of steam alone as a heating medium and cold water as a cooling medium, both being applied in the space between the exterior and interior vats by suitable pipes and openings therein, and disseminated throughout said space by means that will be hereafter explained.

To enable others skilled in the art to make and use our invention, we will proceed to describe the same with reference to the drawings.

Figure 1:
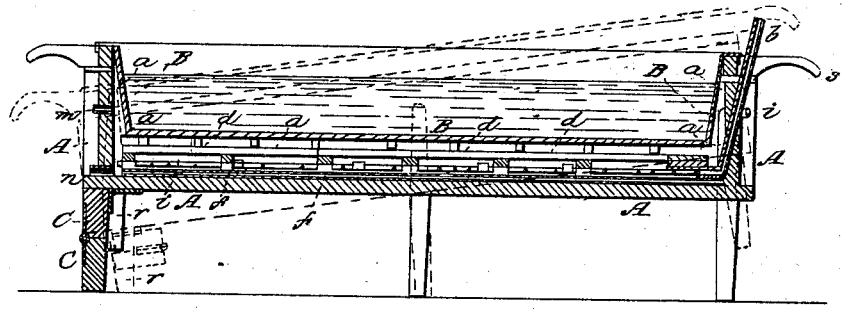
Figure 1 represents a longitudinal vertical section through the vat, and heating and cooling chamber below it.
Figure 2:
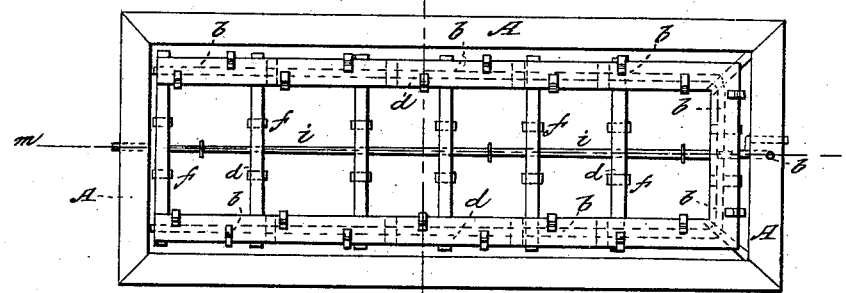
Figure 2 represents the bottom of the outside vat, the inner vat being removed to better show the steam and cold-water pipes and slatted bottom.
Figure 3:
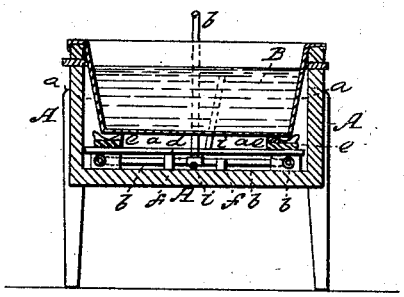
Figure 3 represents a vertical transverse section through the apparatus, taken at the red line $x\,x$, of fig. 2.

A represents an external wooden vat, such as are commonly used in cheese dairies or in cheese-making. Into the interior of this vat, resting upon its top portion, is placed the usual tin or metal vat B for containing the milk to be heated, there being a space, $a\,a\,a$, between said vats for the heat or water to circulate through. Steam is introduced into the space $a$ by means of a steam pipe, $b$, leading from any steam generator or boiler, and this steam pipe, after it enters into the space between the vats, branches into two pipes, as shown by the dotted lines in fig. 2, and extend around on both sides underneath the interior vat. The pipe $b$ is furnished with holes or slots, or both, for the steam to pass through into the space $a$, and these openings may increase in area, as they are more remote from where the steam enters, so as to make up by increased quantity what is lost by density. Over the steam pipes $b$ the broad strip $d$ of the slatted bottom lies, and opposite the openings in the steam pipes deflectors $e$, fig. 3, are arranged to prevent the steam from striking the metal vat at one single point, and to disseminate it regularly throughout the entire space $a$. The slatted bottom $d$ is supported upon pegs, $f$, which raise it above the steam and water pipes; and upon the slatted bottom the inner vat B rests. The cold-water pipe $i$ occupies a central position in the vat, and it, too, is furnished with holes or openings so that jets or spray may be thrown against the bottom of the inner vat B, when the steam or heat has been shut off, and it is necessary or expedient to quickly cool the contents of the inner vat. The steam pipes $b$ are elevated from the bottom of the exterior vat sufficiently to keep them out of or above what water may accumulate from condensation of the steam, and prevent the noise it would make when escaping through water. The outer vat is furnished with the usual draw-off pipes or cocks, as at $m\,n$, fig. 1, for emptying it when necessary, and may have a hinged foot, C, at one end, which, when folded up, and that end allowed to rest upon a shorter support, $r$, tips the vat, as shown in red lines, fig. 1, to drain or draw it off. The inner vat is furnished with handles, $s$, by which it may be readily removed or replaced. The openings in the water pipe may also, like those in the steam pipes, increase in area from inlet to outlet for cooling uniformly.

Having thus fully described our invention, what we claim therein as new, and desire to secure by Letters Patent, is—

The perforated steam and water pipes, introduced into the space between the exterior and interior vats for the purpose of heating regularly with steam, and instantly (when necessary) shutting off the steam and applying jets of cold water to cool the contents of the inner vat by means and for the purposes herein described.

LEVI C. SCHERMERHORN,
JOHN M. SCHERMERHORN.

Witnesses:
 JOHN G. BARRY,
 ORRIN W. SMITH.